(12) United States Patent
Martin et al.

(10) Patent No.: US 7,823,269 B2
(45) Date of Patent: Nov. 2, 2010

(54) METHOD FOR MANUFACTURING AN AUXILIARY ANTENNA

(75) Inventors: Philippe Martin, Beaune (FR); Philippe Lecire, Rognac (FR)

(73) Assignee: Tagsys SAS (FR)

( * ) Notice: Subject to any disclaimer, the term of this patent is extended or adjusted under 35 U.S.C. 154(b) by 0 days.

(21) Appl. No.: 11/893,587

(22) Filed: Aug. 16, 2007

(65) Prior Publication Data

US 2008/0088459 A1    Apr. 17, 2008

Related U.S. Application Data

(60) Provisional application No. 60/852,352, filed on Oct. 17, 2006.

(51) Int. Cl.
*H01Q 13/00* (2006.01)

(52) U.S. Cl. ............... 29/600; 29/825; 156/264; 343/867; 340/572.8

(58) Field of Classification Search ........ 29/600, 29/601.2, 830–832; 343/700 MS, 867–868; 340/572.1–572.4; 156/267–269, 64
See application file for complete search history.

(56) References Cited

U.S. PATENT DOCUMENTS

| | | | | |
|---|---|---|---|---|
| 5,645,932 A | * | 7/1997 | Uchibori | 428/347 |
| 6,618,939 B2 | * | 9/2003 | Uchibori et al. | 29/846 |
| 7,368,032 B2 | * | 5/2008 | Green et al. | 156/264 |
| 7,448,125 B2 | * | 11/2008 | Carmi et al. | 29/600 |
| 7,533,455 B2 | * | 5/2009 | Wehr | 29/600 |
| 2004/0154161 A1 | * | 8/2004 | Aoyama et al. | 29/739 |
| 2005/0085010 A1 | * | 4/2005 | Tsunoda et al. | 438/106 |
| 2008/0088459 A1 | * | 4/2008 | Martin et al. | 340/572.7 |

* cited by examiner

*Primary Examiner*—Minh Trinh
(74) *Attorney, Agent, or Firm*—Lerner, David, Littenberg, Krumholz & Mentlik, LLP

(57) ABSTRACT

A method is disclosed of forming on a moving surface an auxiliary antenna for an RFID tag. The method includes the steps of providing a webstock of polymeric material including a conductive film, conveying the webstock with the moving surface, and applying the conductive film to the moving surface in a shape corresponding to the auxiliary antenna. The moving surface may include cardboard in a roll manufacturing process. Depending on the thickness of the auxiliary antenna the step of applying the conductive film may include cold or hot stamping. Apparatus for forming an auxiliary antenna for an RFID tag is also disclosed.

13 Claims, 3 Drawing Sheets

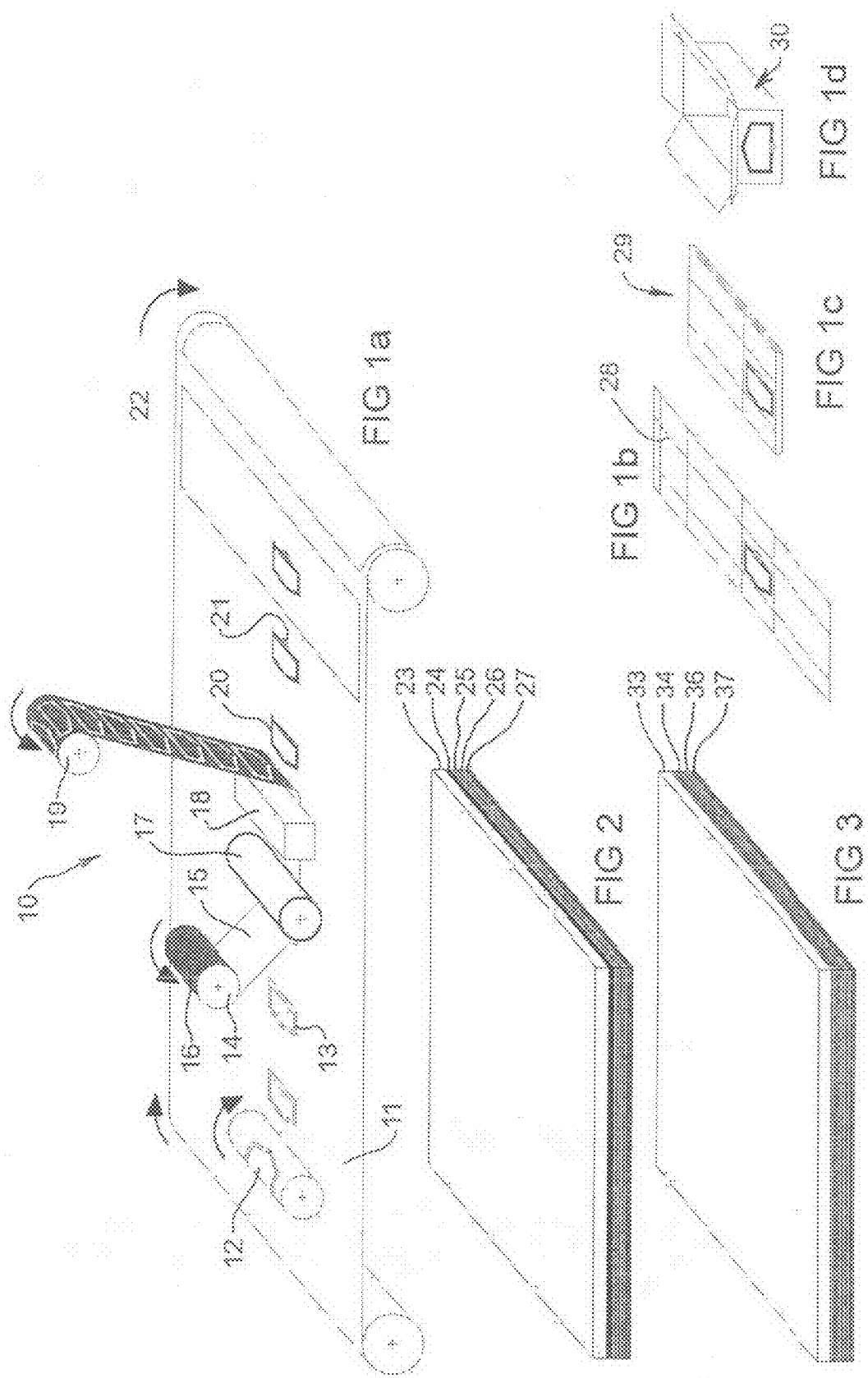

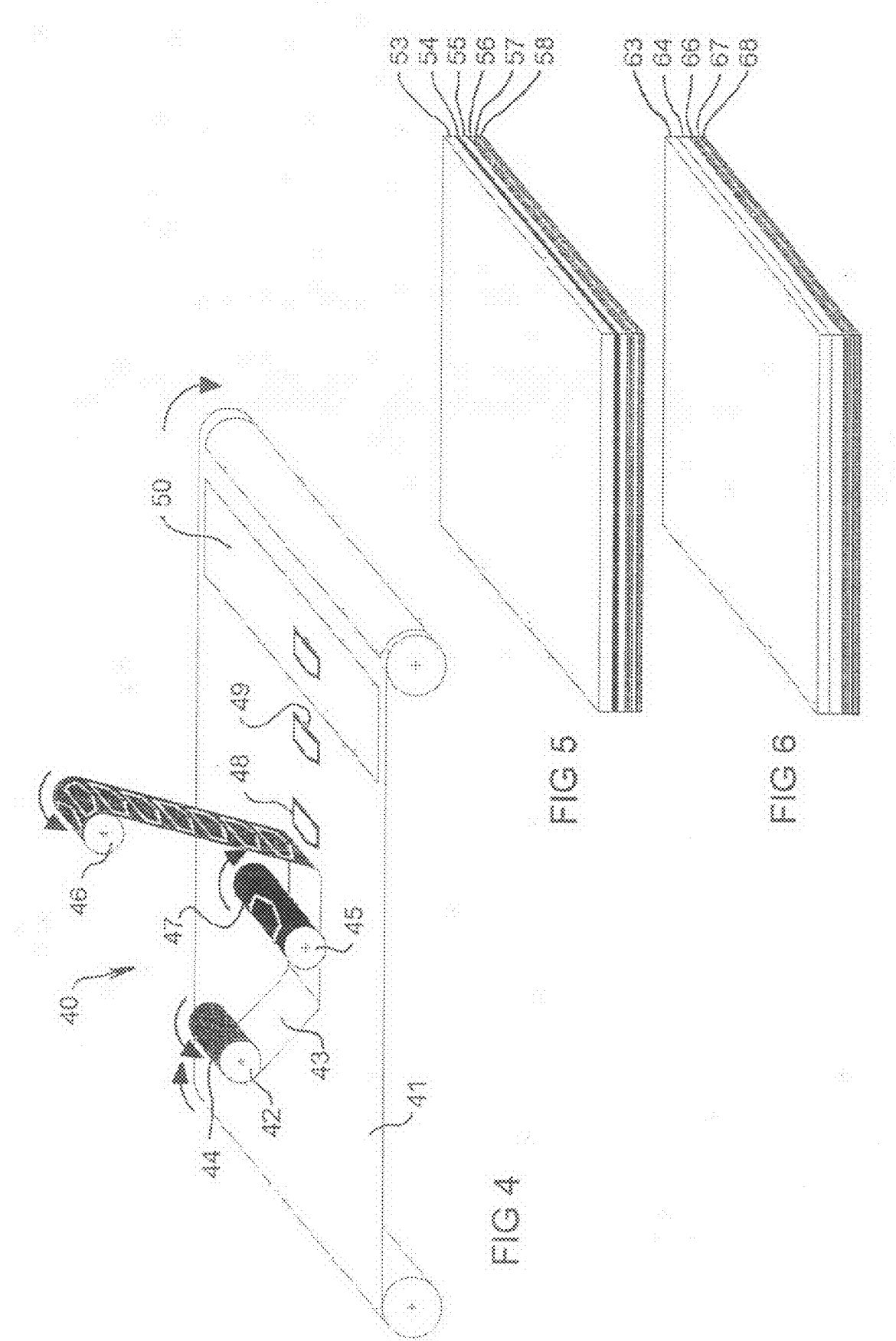

METHOD FOR MANUFACTURING AN AUXILIARY ANTENNA

CROSS-REFERENCE TO RELATED APPLICATIONS

This application claims the benefit of the filing date of U.S. Provisional Patent Application No. 60/852,352 filed Oct. 17, 2006, the disclosure of which is hereby incorporated herein by reference.

FIELD OF THE INVENTION

The present invention relates to the field of Radio Frequency Identification (RFID) tags and in particular relates to a method and apparatus for manufacturing an auxiliary antenna for an RFID tag.

BACKGROUND OF THE INVENTION

RFID tags are used to associate an object with information stored in the tag such as an identification code. The RFID tag is read via the principle of electromagnetic (EM) communication wherein an interrogator containing a transmitter generates an EM signal that is transmitted via an antenna associated with the interrogator to an antenna associated with the tag. In a passive tag the antenna receives a portion of the transmitted energy and through a rectifier generates DC power for operating a reply generation circuit. The reply generation circuit encodes the information stored in the tag into an EM reply signal that is radiated by the antenna. The radiated signal is received by the interrogator antenna and the information is decoded by the interrogator.

A typical RFID tag module has a limited read range that may be less than 40 cm. To enhance performance of the tag when it is applied to an object it is known to couple a secondary or auxiliary antenna to the antenna on the tag. The auxiliary antenna may be larger than the tag antenna and may be located on the same object in close proximity to the tag antenna so that it is electromagnetically coupled thereto.

Prior art methods for manufacturing such range enhancing or auxiliary antennas include etching of suitable conductors such as copper or aluminum on a substrate, and/or depositing conductive ink by means of screen printing, photographic or offset printing processes or the like. However, such manufacturing methods require too many steps and are relatively slow and expensive to apply. They are also not able to be incorporated into a cardboard roll manufacturing process.

SUMMARY OF THE INVENTION

In accordance with the present invention a process is provided for manufacturing an auxiliary antenna for an RFID tag that at least alleviates the above described disadvantages of the prior art. Further in accordance with the present invention, a process is provided for manufacturing an auxiliary antenna for an RFID tag that may be incorporated into a roll manufacturing process such as a cardboard roll manufacturing process.

According to one aspect of the present invention there is provided a method of forming on a moving surface an auxiliary antenna for an RFID tag, said method including the steps of:

providing a webstock of polymeric material including a conductive film, said webstock of polymeric material including a release layer to facilitate release of said conducting film from said webstock;

conveying said webstock with said moving surface;

applying an adhesive to said moving surface in a shape corresponding to said auxiliary antenna.

pressing said conductive film to said adhesive by means of a pressing roller such that portions of said conductive film adhere to said surface in said shape corresponding to said auxiliary antenna; and pulling said web stock from said surface such that said adhered portions of said conductive film peel away from said webstock leaving said portions adhered to said moving surface in said shape corresponding to said auxiliary antenna.

The moving surface may include cardboard in a roll manufacturing process. The webstock preferably is conveyed between a supply roller and a take up roller.

The step of applying the conductive film may include cold stamping. Cold stamping may include applying adhesive to the moving surface. The adhesive may be applied substantially in a shape corresponding to the antenna. The adhesive may be applied via an offset printing roller. Cold stamping may include pressing the conductive film to the adhesive via a pressing roller and curing the adhesive with ultra violet light.

The step of applying the conductive film may include hot stamping. Hot stamping may include applying adhesive to the conductive film and pressing the film to the moving surface via a pressing roller. The pressing roller may have a relief portion substantially in a shape corresponding to the antenna. Hot stamping may include curing the adhesive via application of heat.

The method of the present invention may include applying an RFID tag over the auxiliary antenna. The RFID tag may include a tag antenna. The RFID tag preferably is applied over the auxiliary antenna such that it is electromagnetically coupled with the tag antenna. The method may include punching the cardboard surface into carton blanks such that the auxiliary antenna is positioned on a side panel of the carton. The method may include embossing each carton blank with fold lines, folding the blank along the fold lines and assembling the blank into a carton.

According to a further aspect of the present invention there is provided an apparatus for forming on a moving surface an auxiliary antenna for an RFID tag, said apparatus including:

means for providing a webstock of polymeric material including a conductive film;

means for conveying said webstock with said moving surface; and means for applying said conductive film to said moving surface in a shape corresponding to said antenna.

BRIEF DESCRIPTION OF THE DRAWINGS

Preferred embodiments of the present invention will now be described with reference to the accompanying detailed description which refers to the drawings wherein:

FIG. 1a is a top, perspective, schematic view of a cold stamping process for manufacturing an auxiliary antenna for an RFID tag in accordance with the present invention;

FIG. 1b is a top, perspective, schematic view of a subsequent step in the cold stamping process shown in FIG. 1a;

FIG. 1c is a top, perspective, schematic view of a subsequent step in the cold stamping process shown in FIG. 1a;

FIG. 1d is a top, perspective, schematic view of a subsequent step in the cold stamping process shown in FIG. 1a;

FIG. 2 is a side, perspective, cross-sectional view of webstock including conductive film suitable for use with cold stamping in accordance with the present invention;

FIG. 3 is a side, perspective, cross-sectional view of further webstock including conductive film suitable for use with the cold stamping process of the present invention;

FIG. 4 is a top, perspective, schematic view of a hot stamping process for manufacturing an auxiliary antenna for an RFID tag in accordance with the present invention;

FIG. 5 is a side, perspective, cross-sectional view of webstock including conductive film suitable for use with hot stamping in accordance with the present invention;

FIG. 6 is a side, perspective, cross-sectional view of further webstock including conductive film suitable for use with hot stamping in accordance with the present invention;

FIG. 7b is a front view of the auxiliary antenna shown in FIG. 7a; and

FIG. 7c is a side, perspective, enlarged view of the RFID tag module shown in FIG. 7a.

DETAILED DESCRIPTION

Figure 7A:
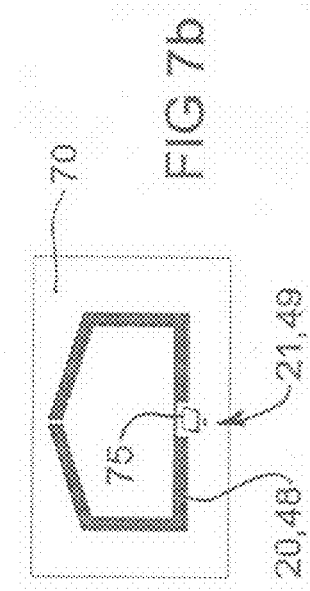
FIG. 7a is a side, perspective view of an auxiliary antenna and RFID tag applied to a cardboard object in accordance with the present invention.

FIG. 1a shows a cardboard roll manufacturing process including a cold stamping apparatus 10 for manufacturing an auxiliary antenna 20 for an RFID tag 21. The cold stamping apparatus 10 shown in FIG. 1a is adapted to apply a relatively thin antenna (approximately not more than about 5 µm) to a cardboard surface 11 in the cardboard roll manufacturing process. The cold stamping apparatus 10 includes an offset printing roll 12 for applying to the surface 11 of the cardboard roll a suitable adhesive 13 in a shape corresponding to the auxiliary antenna. The apparatus 10 includes a roller 14 for supplying continuous webstock 15 including a conductive film 16. The conductive film 16 is applied to the surface 11 of the cardboard roll by means of a pressing roller 17 and a source 18 of ultra violet (UV) light for irradiating the film prior to being taken up by a roller 19.

Pressure applied by roller 17 causes the conductive film 16 to adhere to the adhesive 13 in the shape corresponding to the auxiliary antenna 20. The adhesive is cured via the UV source 18. As webstock 15 is pulled away from surface 11 the conductive film peels away from webstock 15 and the webstock excluding portions corresponding to the peeled antennas is taken up by roller 19.

An RFID tag module 21 is then positioned and applied over the auxiliary antenna 20. The carton blank is subsequently punched from the cardboard roll at punching station 22 prior to being embossed with fold lines 28 (refer FIG. 1b), folded 29 along the fold lines (refer FIG. 1c) and assembled into a carton 30 (refer FIG. 1d).

FIG. 2 shows one example of webstock 15 including conductive film suitable for use with the cold stamping process. The webstock 15 includes a substrate 23 comprising a flexible polymeric material such as polyester (PE), polyethylene terephthalate (PET) or polyethylene napthalate (PEN). A release layer 24 is applied over the substrate 23 to facilitate peeling of subsequent layers from substrate 23. An insulating layer 25 such as a varnish is applied over the release layer 24. The insulating layer 25 may be color coded for a purpose as described below. A layer of a first conductive material 26 such as aluminum is applied over the insulating layer 25. A layer of a second conductive material 27 such as copper is applied over the first conductive material 26. The conductive layers may be deposited over the insulating layer in any suitable manner and by any suitable means such as by metal evaporation. The relative thickness of the first and second layers of conductive material may vary in the range of 25% to 75%.

The relative thickness may be varied to adjust resistivity of the conductive film and for a purpose as described below. The resistivity of the conductive film is preferably in the range of 0.05-0.1 ohms/cm or less.

FIG. 3 shows another example of webstock 15 including conductive film suitable for use with the cold stamping process. The webstock 15 includes a substrate 33 comprising a flexible polymeric material (PE, PET or PEN), a combined insulating/release layer 34 is applied over the substrate 33 to facilitate peeling thereof from substrate 33. A layer of a first conductive material 36 (e.g. aluminum) is applied over the insulating/release layer 34. A layer of a second conductive material 37 (e.g. copper) is applied over the first conductive material 36.

The color of the varnish may be defined in accordance with a specific use. The defined color may provide an anti-counterfeiting measure and/or a means for coding products, e.g. the varnish may be colored red for dangerous goods, blue for safe goods, green for perishable goods, etc. Colored varnish may also be used for aesthetic purposes.

An additional or alternative anti-counterfeiting/coding measure may include adjusting relative thickness of the first and second conductive materials 26/36, 27/37. In one form the relative thickness of the conductive materials may be 75% aluminum and 25% copper. The relative thicknesses of the first and second conductive materials may be detected and/or measured by means of x-ray fluorescence spectroscopy. If a detected and/or measured thickness of the first and second conductive materials does not substantially agree with an expected relative thickness of the conductive materials, the product may be treated as being counterfeit or non-genuine.

FIG. 4 shows a cardboard roll manufacturing process including a hot stamping apparatus 40 for manufacturing an auxiliary antenna 48 for an RFID tag 49. The hot stamping apparatus 40 is adapted to apply a relatively thick antenna (approximately at least about 5 µm) to a cardboard surface 41 in the cardboard roll manufacturing process. The hot stamping apparatus 40 includes a roller 42 for supplying continuous webstock 43 including a conductive film 44 overlaid with a heat curing adhesive. The conductive film 44 and adhesive is applied to the surface 41 of the cardboard roll by means of a pressing roller 45 and a source of heat (not shown) prior to being taken up by a roller 46.

Pressing roller 45 includes a relief portion 47 in a shape corresponding to the auxiliary antenna 48. Pressure applied by the relief portion 47 of roller 45 causes conductive film 44 to adhere to the surface 41 in the shape corresponding to the antenna 48. Adhesive provided on the conductive film 44 is cured by the heat source. As webstock 43 is pulled away from surface 41, the conductive film peels away from webstock 43 and the webstock excluding portions corresponding to the peeled antennas is taken up by roller 46.

An RFID tag module 49 is then positioned and applied over the conductive antenna 48. The carton blank is subsequently punched from the cardboard roll at punching station 50 prior to being embossed with fold lines, folded and assembled into a carton as described with reference to FIGS. 1b to 1d.

FIG. 5 shows one example of webstock 43 including conductive film suitable for use with the hot stamping process. The webstock 43 includes a substrate 53 comprising a flexible polymeric material such as polyester (PE), polyethylene terephthalate (PET) or polyethylene napthalate (PEN). A release layer 54 is applied over the substrate 53 to facilitate peeling of subsequent layers from substrate 53. An insulating layer 55 such as a colored varnish is applied over the release layer 54. The insulating layer 55 may be color coded for a purpose as described above. A layer of a first conductive material 56 such as aluminum is applied over the insulating layer 55. A layer of a second conductive material 57 such as copper is applied over the first conductive material 56. The conductive layers may be deposited over the insulating layer in any suitable manner and by any suitable means such as by means of metal evaporation. The relative thickness of the first and second layers of conductive layers may vary in the range of 25% to 75%. The relative thickness may be varied for a purpose as described above. The resistivity of the first and second conductive layers preferably is in the range of 0.05-0.1 ohms/cm or less. A final layer of a heat curing adhesive 58 is applied over the second layer of conductive material 57.

FIG. 6 shows another example of webstock 43 including conductive film. The webstock 43 includes a substrate 63 comprising a flexible polymeric material (PE, PET or PEN). A combined insulating/release layer 64 is applied over the substrate 63 to facilitate peeling thereof from substrate 63. A layer of a first conductive material 66 (e.g. aluminum) is applied over the insulating/release layer 64. A layer of a second conductive material 67 (e.g. copper) is applied over the first conductive material 66. A final layer of a heat curing adhesive 68 is applied over the second layer of conductive material 67.

Figure 7B:
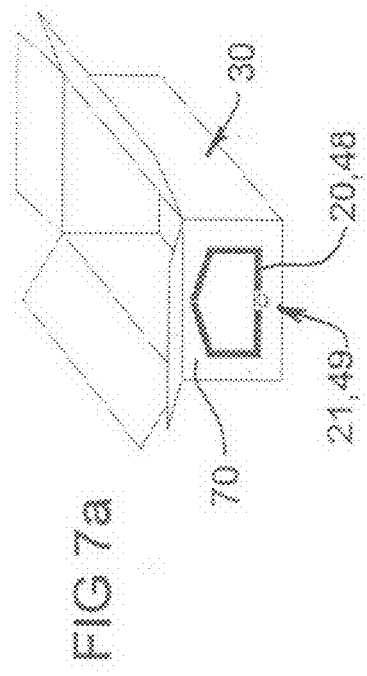
Figure 7C:
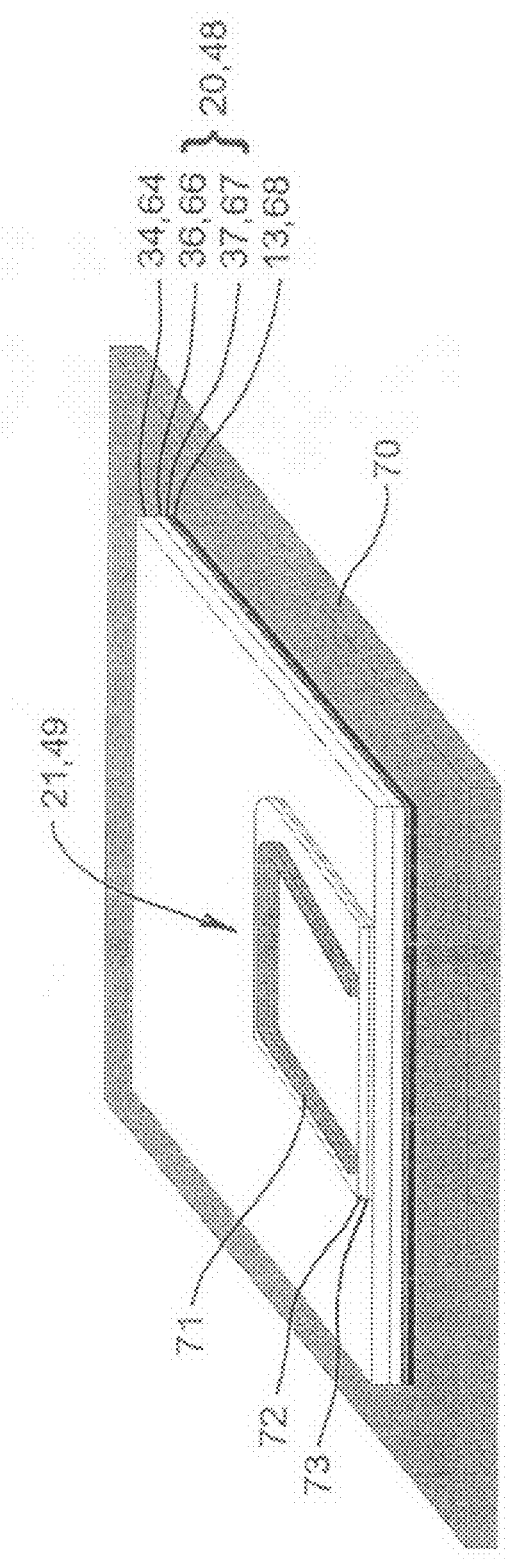

FIGS. 7a to 7c show RFID tag module 21, 49 positioned relative to an auxiliary antenna 20, 48 applied to a side panel 70 of a cardboard box or carton 30. The RFID tag module 21, 49 is preferably applied such that it overlaps a portion of a conductive track of the auxiliary antenna 20, 48. An enlarged view of the RFID tag module 21, 49 and auxiliary antenna 20, 48 is shown in FIG. 7c. The RFID tag module 21, 49 includes a U-shaped tag antenna 71 formed over a PET substrate 72, and an IC chip (not shown) connected to antenna 71. A layer of adhesive 73 is applied to the underside of substrate 72. The RFID tag module 21, 49 is affixed over the insulating layer 34, 64 (colored varnish) associated with auxiliary antenna 20, 48.

Finally, it is to be understood that various alterations, modifications and/or additions may be introduced into the constructions and arrangements of parts previously described without departing from the spirit or ambit of the invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of forming on a moving surface an auxiliary antenna for an RFID tag, said method including the steps of:
providing a webstock of polymeric material including a conductive film, said webstock of polymeric material including a release layer to facilitate release of said conductive film from said webstock; conveying said webstock with said moving surface;
applying an adhesive to said moving surface in a shape corresponding to said auxiliary antenna;
pressing said conductive film to said adhesive by means of a pressing roller such that portions of said conductive film adhere to said surface in said shape corresponding to said auxiliary antenna; and
pulling said webstock from said surface such that said adhered portions of said conductive film peel away from said webstock leaving said portions adhered to said moving surface in said shape corresponding to said auxiliary antenna.

2. The method according to claim 1 wherein said moving surface includes cardboard in a roll manufacturing process.

3. The method according to claim 2 including punching said cardboard surface into carton blanks such that said auxiliary antenna is positioned on a side panel of said carton and embossing each carton blank with fold lines, folding said blank along said fold line and assembling said blank into a carton.

4. The method according to claim 1 wherein said adhesive is applied substantially in said shape corresponding to said auxiliary antenna by means of an offset printing roller.

5. The method according to claim 1 wherein said adhesive is cured with ultra violet light.

6. The method according to claim 1 wherein said pressing roller includes a relief portion substantially in said shape corresponding to said auxiliary antenna.

7. The method according to claim 1 wherein said adhesive is cured by means of application of heat.

8. The method according to claim 1 including applying an RFD tag over said auxiliary antenna wherein said RFID tag includes a tag antenna, and wherein said RFID tag is applied over said auxiliary antenna such that it is electromagnetically coupled with said tag antenna.

9. The method according to claim 1 wherein said conductive film includes a layer of a first conductive material including aluminum.

10. The method according to claim 9 wherein said conductive film includes a layer of a second conductive material including copper.

11. The method according to claim 1 wherein resistivity of said conductive film is substantially in the range of 0.05 to 0.1 ohms/cm and wherein relative thickness of said first and second layers of conductive material is in the range of 25% to 75%.

12. The method according to claim 1 wherein said conductive film includes a layer of an insulating material and said insulating material includes a layer of varnish.

13. The method according to claim 12 wherein said insulating varnish is colored.

* * * * *

UNITED STATES PATENT AND TRADEMARK OFFICE
CERTIFICATE OF CORRECTION

| | | |
|---|---|---|
| PATENT NO. | : 7,823,269 B2 | Page 1 of 1 |
| APPLICATION NO. | : 11/893587 | |
| DATED | : November 2, 2010 | |
| INVENTOR(S) | : Philippe Martin and Philippe Lecire | |

It is certified that error appears in the above-identified patent and that said Letters Patent is hereby corrected as shown below:

On the cover of the patent, (57) ABSTRACT, line 2, "RFID" should read --a radio frequency identification (RFID)--.

Column 2, line 8, "web stock" should read --webstock--.
Column 4, line 40, delete "is" and insert therefor --are--.
Column 5, line 11, "heat curing" should read --heat-curing--.
Columns 5, line 21, "heat curing" should read --heat-curing--.
Column 6, line 33, delete "RFD" and insert therefor --RFID--.

Signed and Sealed this
Eighteenth Day of October, 2011

David J. Kappos
*Director of the United States Patent and Trademark Office*